(12) United States Patent
Wang et al.

(10) Patent No.: US 10,506,633 B2
(45) Date of Patent: Dec. 10, 2019

(54) METHOD FOR DETERMINING SIZE OF CONTENTION WINDOW, RADIO BASE STATION, AND MOBILE STATION

(71) Applicant: NTT DOCOMO INC., Tokyo (JP)

(72) Inventors: Jing Wang, Beijing (CN); Liu Liu, Beijing (CN); Huiling Jiang, Beijing (CN); Hiroki Harada, Tokyo (JP); Satoshi Nagata, Tokyo (JP)

(73) Assignee: NTT DoCoMo, INC., Tokyo (JP)

( * ) Notice: Subject to any disclaimer, the term of this patent is extended or adjusted under 35 U.S.C. 154(b) by 0 days.

(21) Appl. No.: 15/762,354

(22) PCT Filed: Sep. 23, 2016

(86) PCT No.: PCT/CN2016/099896
§ 371 (c)(1),
(2) Date: Mar. 22, 2018

(87) PCT Pub. No.: WO2017/050276
PCT Pub. Date: Mar. 30, 2017

(65) Prior Publication Data
US 2018/0263054 A1    Sep. 13, 2018

(30) Foreign Application Priority Data

Sep. 24, 2015   (CN) .......................... 2015 1 0618394

(51) Int. Cl.
*H04W 74/08* (2009.01)
*H04L 1/18* (2006.01)
(Continued)

(52) U.S. Cl.
CPC .......... *H04W 74/08* (2013.01); *H04L 1/1887* (2013.01); *H04W 24/08* (2013.01);
(Continued)

(58) Field of Classification Search
None
See application file for complete search history.

(56) References Cited

U.S. PATENT DOCUMENTS 9,301,150 B2    3/2016   Vermani et al.
9,860,874 B2 *  1/2018   Jung ..................... H04W 72/04
(Continued)

FOREIGN PATENT DOCUMENTS

CN    103298027 A    9/2013
CN    103929836 A    7/2014
(Continued)

OTHER PUBLICATIONS

International Search Report for PCT/CN2016/099896; ISA/CN, Haidian District, Beijing, dated Dec. 15, 2016 with English translation.
(Continued)

*Primary Examiner* — Hong S Cho
(74) *Attorney, Agent, or Firm* — Harness, Dickey & Pierce, P.L.C.

(57) ABSTRACT

Embodiments of the present invention provide a method for determining a size of a contention window, a wireless base station and a mobile station. An information transmission method according to an embodiment of the present invention is performed by the wireless base station, and comprises: obtaining a contention window parameter regarding at least one mobile station; determining a size of a contention window to be used by the at least one mobile station according to the obtained contention window parameter; and generating backoff information according to the determined size of the contention window, and notifying the at least one mobile station of the backoff information.

8 Claims, 7 Drawing Sheets

(51) Int. Cl.
  *H04W 24/08*    (2009.01)
  *H04W 16/14*    (2009.01)
  *H04W 88/08*    (2009.01)
(52) U.S. Cl.
  CPC ........ *H04W 74/0808* (2013.01); *H04W 16/14* (2013.01); *H04W 88/08* (2013.01)

(56) References Cited

U.S. PATENT DOCUMENTS

| | | | |
|---|---|---|---|
| 2008/0279210 A1* | 11/2008 | Naka | H04W 28/18 370/448 |
| 2011/0044303 A1 | 2/2011 | Ji et al. | |
| 2013/0176902 A1 | 7/2013 | Wentink et al. | |
| 2014/0355534 A1 | 12/2014 | Vermani et al. | |
| 2014/0355556 A1 | 12/2014 | Vermani et al. | |
| 2015/0009814 A1* | 1/2015 | Wu | H04W 28/0289 370/230 |
| 2015/0208444 A1 | 7/2015 | Park et al. | |
| 2016/0029223 A1 | 1/2016 | Vermani et al. | |

FOREIGN PATENT DOCUMENTS

| | | |
|---|---|---|
| CN | 104640230 A | 5/2015 |
| JP | 2008060852 A | 3/2008 |
| JP | 2009055333 A | 3/2009 |
| JP | 2013502191 A | 1/2013 |
| WO | WO-2014110513 A1 | 7/2014 |
| WO | WO-2014197307 A1 | 12/2014 |

OTHER PUBLICATIONS

Written Opinion of the ISA for PCT/CN2016/099896; ISA/CN, Haidian District, Beijing, dated Dec. 15, 2016.
International Preliminary Report on Patentability (Ch. I) for PCT/CN2016/099896, IB/Geneva, dated Mar. 27, 2018, incorporating the English Translation of the Written Opinion of the ISA, ISA/CN, Beijing, dated Dec. 15, 2016.
Extended European Search Report regarding EPSN 168481570, dated Mar. 21, 2019.
Huawei et al., "Triggering Mechanism for Contention Window Size Adaptation", 3GPP TSG RAN WGI Meeting #82, Beijing, China, Aug. 24-28, 2015.
Samsung, "Discussion on Category 4 LBT for UL transmission", 3GPP TSG RAN WG1 Meeting #82, Beijing, China, Aug. 24-28, 2015.
Samsung, "Details of DL Cat 4 LBT procedure", 3GPP TSG RAN WG1 Meeting #82, Beijing, China, Aug. 24-28, 2015.
ZTE, "LBT Impacts on High Layers for LAA", 3GPP TSG-RAN WG2#90, R2-152327, Fukuoka, Japan, May 25-29, 2015.
Japanese Office Action regarding JPSN 2018515501, dated Mar. 5, 2019.

* cited by examiner

METHOD FOR DETERMINING SIZE OF CONTENTION WINDOW, RADIO BASE STATION, AND MOBILE STATION

CROSS-REFERENCE TO RELATED APPLICATIONS

This application is a 371 U.S. National Stage of International Application No. PCT/JP2016/099896, filed Sep. 23, 2016, which claims the benefit of and priority to Chinese Patent Application No. 201510618394.1, filed Sep. 24, 2015. The disclosures of the above applications are incorporated herein by reference.

TECHNICAL FIELD

The present invention relates to a method for determining a size of a contention window, a wireless base station and a mobile station. More particularly, the present invention relates to a method for determining a size of a contention window used in a listen-before-talk mechanism in an unlicensed frequency band, a wireless base station and a mobile station.

BACKGROUND

In a current wireless communication system such as LTE (Long Term Evolution), a wireless base station and a mobile station communicate via a licensed frequency band. However, in the case of more data traffic being required such as watching videos online, a data transmission rate of the current wireless communication system is often not satisfactory. Therefore, in a future wireless communication system such as LTE-Advanced (LTE-A) subsequent to LTE, it is being studied that a License Assisted Access technology is used to further increase a throughput of a mobile communication system. In a cell employing the License Assisted Access technology, a base station and a user are allowed to communicate via an unlicensed frequency band used by other systems such as a WiFi system, in addition to the licensed frequency band.

Since the wireless communication system and other systems such as the WiFi system jointly use the unlicensed frequency band in the License Assisted Access technology, the base station and the mobile station need to listen to the unlicensed frequency band before transmitting data, to confirm that the unlicensed frequency band is available. In the WiFi system, an Access Point (AP) and a terminal device may listen to the unlicensed frequency band by using a Carrier Sense Multiple Access with Collision Avoidance (CSMA/CA) listening strategy before transmitting data. In the strategy, the Access Point and the terminal device perform a random backoff algorithm by randomly selecting a backoff counter initial value (i.e. a number of times for backoff that need to be performed before transmitting data) according to a size of a contention window, where the size of the contention window may be adjusted according to an ACK/NACK signaling transmitted by the terminal device to the Access Point or an ACK/NACK signaling transmitted by the Access Point to the terminal device.

SUMMARY OF THE INVENTION

In the License Assisted Access technology, for an uplink transmission, the user also needs to listen to the unlicensed frequency band before transmitting data, and can employ a carrier listening strategy similar to that for WiFi. Therefore, in the License Assisted Access technology, the random backoff algorithm implemented according to the size of the contention window may also be involved in the uplink transmission. However, for the uplink with the License Assisted Access technology, an asynchronous uplink hybrid automatic retransmission is used, and the wireless base station no longer uses a PHICH channel to transmit the ACK/NACK signaling to the mobile station. That is, in the License Assisted Access technology, the mobile station cannot obtain the ACK/NACK signaling for the uplink transmission and cannot adjust the size of the contention window according to the ACK/NACK signaling.

The present invention has been made in view of the above points, and an object of the present invention is to provide a method for determining a size of a contention window, a wireless base station and a mobile station, which can adjust the size of the contention window used by the mobile station in a wireless communication system employing the License Assisted Access technology.

According to an aspect of the present invention, there is provided a method for determining a size of an uplink contention window, performed by a wireless base station. The method comprises: obtaining a contention window parameter regarding at least one mobile station; determining the size of the contention window to be used by the at least one mobile station according to the obtained contention window parameter; and generating backoff information according to the determined size of the contention window, and notifying the at least one mobile station of the backoff information.

According to another aspect of the present invention, there is provided a method for determining a size of an uplink contention window, performed by a mobile station. The method comprises: obtaining data transmission information (new data indicator, NDI) indicating whether data transmitted by the mobile station scheduled by a wireless base station is new data or retransmitted old data; determining a size of a contention window to be used by the mobile station according to the data transmission information obtained within a predetermined time period; and adjusting the contention window to be used by the mobile station according to the determined size of the contention window.

According to another aspect of the present invention, there is provided a method for determining a size of an uplink contention window, performed by a mobile station. The method comprises: detecting a channel in which data is expected to be transmitted within an observation time period, to obtain a channel detection result indicating whether a state of the channel is busy or idle; determining a size of a contention window to be used by the mobile station according to the channel detection result; and adjusting the contention window to be used by the mobile station according to the determined size of the contention window.

According to another aspect of the present invention, there is provided a wireless station. The wireless station comprises: a parameter obtaining unit configured to obtain a contention window parameter regarding at least one mobile station; a window determining unit configured to determine a size of a contention window to be used by the at least one mobile station according to the obtained contention window parameter; and an information notifying unit configured to generate backoff information according to the determined size of the contention window, and notify the at least one mobile station of the backoff information.

According to another aspect of the present invention, there is provided a mobile station. The mobile station comprises: an information obtaining unit configured to obtain data transmission information indicating whether data transmitted by the mobile station scheduled by a wireless base station is new data or retransmitted old data; a window determining unit configured to determine a size of a contention window to be used by the mobile station according to the data transmission information obtained within a predetermined time period; and a window adjusting unit configured to adjust the contention window to be used by the mobile station according to the determined size of the contention window.

According to another aspect of the present invention, there is provided a mobile station. The mobile station comprises: a detecting unit configured to detect a channel in which data is expected to be transmitted within an observation time period, to obtain a channel detection result indicating whether a state of the channel is busy or idle; a window determining unit configured to determine a size of a contention window to be used by the mobile station according to the channel detection result; and a window adjusting unit configured to adjust the contention window to be used by the mobile station according to the determined size of the contention window.

In the solutions according to the above aspects of the present invention, the size of the contention window to be used by the mobile station can be appropriately adjusted even if the mobile station cannot obtain the ACK/NACK signaling, so that the wireless communication system can effectively utilize the unlicensed frequency band for data transmission.

BRIEF DESCRIPTION OF THE DRAWINGS

The above and other objects, features and advantages of the present invention will become clearer by describing embodiments of the present invention in detail with reference to the accompanying drawings, in which.

DESCRIPTION OF THE EMBODIMENTS

Figure 1:
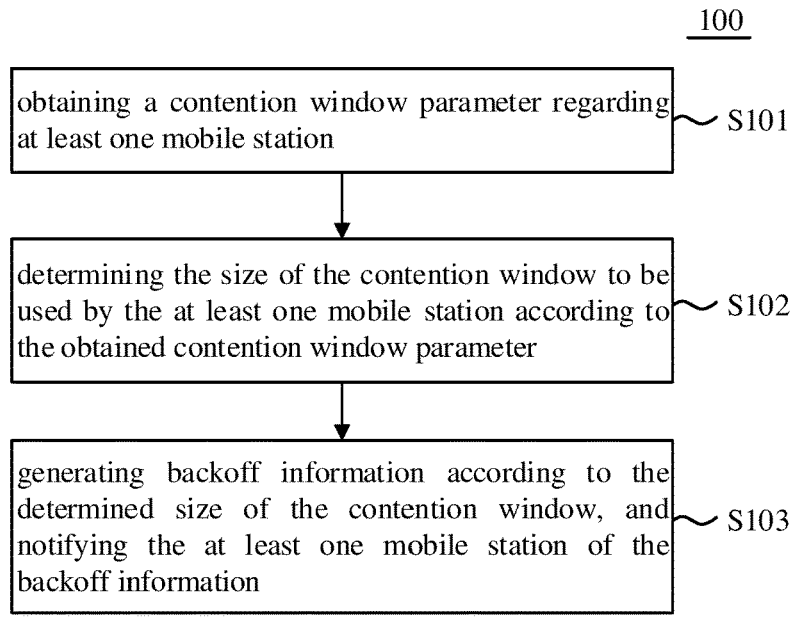
FIG. 1 is a flow chart describing a method for determining a size of a contention window according to an embodiment of the present invention.

Hereinafter, a method for determining a size of a contention window, a wireless base station and a mobile station according to embodiments of the present invention will be described with reference to the accompanying drawings. Like reference numerals refer to like elements throughout the drawings. It should be understood that the embodiments described herein are merely illustrative and should not be construed as limiting the scope of the invention.

FIG. 1 is a flow chart describing a method 100 for determining a size of a contention window according to an embodiment of the present invention. The method 100 for determining the size of the contention window may be performed by a wireless base station. Hereinafter, the method 100 for determining the size of the contention window according to the embodiment of the present invention will be presented in detail with reference to FIG. 1. As shown in FIG. 1, in step S101, a contention window parameter regarding at least one mobile station is obtained. For example, the contention window parameter may include a channel quality parameter regarding a channel quality for the mobile station, and may also include a candidate window parameter indicating the size of the contention window to be used by the mobile station which is determined by the mobile station and is transmitted to the base station. According to an example of the present invention, the channel quality parameter may include data demodulation information which indicates whether or not the wireless base station correctly demodulates uplink data. For example, the wireless base station may demodulate the uplink data transmitted from the mobile station, and the data demodulation information may include positive demodulation information indicating that the wireless base station correctly demodulates the uplink data, or negative demodulation information indicating that the wireless base station fails to correctly demodulate the uplink data. According to another example of the present invention, the channel quality parameter may include an uplink sounding reference signal measurement result. For example, the wireless base station may measure a channel for the mobile station by using an uplink sounding reference signal, and generate the uplink sounding reference signal measurement result.

Then, in step S102, the size of the contention window to be used by the at least one mobile station is determined according to the obtained contention window parameter. In the embodiment according to the present invention, the contention window refers to a window for determining a listening strategy for an unlicensed frequency band before data transmission when the mobile station carries on wireless communication in the unlicensed frequency band. In a random backoff algorithm, the mobile station randomly selects a value within a range of the size of the contention window, as a backoff counter initial value (i.e. a number of times for backoff that needs to be performed before transmitting data). For example, when the contention window is 7, the mobile station may randomly select a value between 0 and 7 as the number of times for backoff that needs to be performed (i.e. a number of idle timeslots that need to be listened to by the mobile station before data transmission).

According to an example of the present invention, when the wireless base station wishes to simultaneously schedule a plurality of mobile stations, contention window parameters for the plurality of mobile stations may be obtained in step S101, and in step S102, the wireless base station may determine the size of the contention window to be jointly used by the plurality of mobile stations according to the obtained contention window parameters for the plurality of mobile stations. When the plurality of mobile stations use the contention window that is jointly used, timings for data transmission by the plurality of mobile stations are close to each other, which facilitates that the wireless base station simultaneously schedules data transmitted by the plurality of mobile stations as one subframe.

For example, the contention window parameter may include data demodulation information. In step S101, the data demodulation information for the uplink data of the mobile station may be generated according to the demodulation of the uplink data from each of the plurality of mobile stations. Specifically, the wireless base station may demodulate the uplink data from the respective mobile stations in each uplink subframe, and generate corresponding data demodulation information. The wireless base station may obtain the data demodulation information of the respective mobile stations within a time period including one uplink subframe or a plurality of uplink subframes. Then, in step S102, the size of the contention window to be jointly used by the plurality of mobile stations may be determined according to negative demodulation information in the data demodulation information of the plurality of mobile stations generated within a predetermined time period. The predetermined time period may be one or more uplink subframes in recent uplink transmission bursts, for example, one or more foremost subframes in the recent uplink transmission bursts, or one or more last subframes in the recent uplink transmission bursts.

Figure 2:
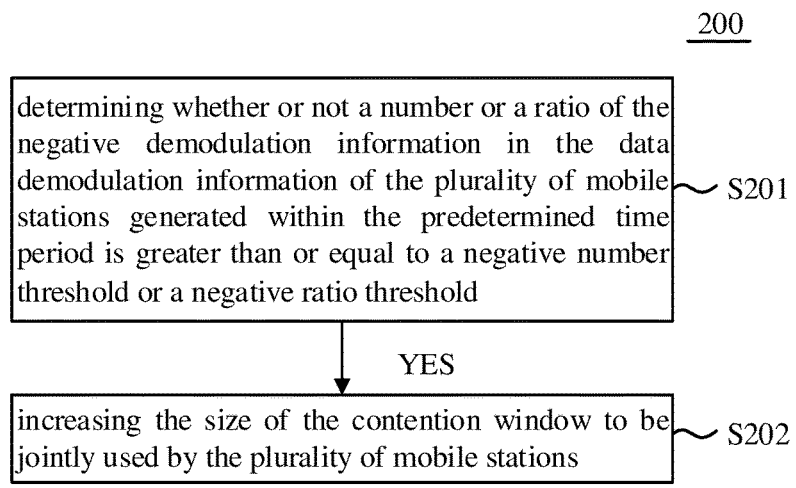
FIG. 2 is a flow chart describing a method for determining a size of contention window in accordance with negative demodulation information, according to an example of the present invention.

FIG. 2 is a flow chart describing a method 200 for determining the size of the contention window according to the negative demodulation information according to an example of the present invention. As shown in FIG. 2, in step S201, it is determined whether or not a number or a ratio of the negative demodulation information in the data demodulation information of the plurality of mobile stations generated within the predetermined time period is greater than or equal to a negative number threshold or a negative ratio threshold. When the number or the ratio of the negative demodulation information in the data demodulation information of the plurality of mobile stations generated within the predetermined time period is greater than or equal to the negative number threshold or the negative ratio threshold, it indicates that the channel states for the plurality of mobile stations are poor and disadvantageous for data transmission. Thus, the size of the contention window to be jointly used by the plurality of mobile stations may be increased in step S202. The negative number threshold or the negative ratio threshold may be set according to requirements for the channel states in the communication system. For example, the negative number threshold may be set to 1 when the requirements for the channel states are high, so that the size of the contention window to be jointly used by the plurality of mobile stations may be increased as long as there is the negative demodulation information in the data demodulation information of the plurality of mobile stations generated within the predetermined time period. As another example, the negative ratio threshold may be set to 100% when the requirements for the channel states are low, so that the size of the contention window to be jointly used by the plurality of mobile stations may be increased only when the wireless base station fails to correctly demodulate the uplink data of all mobile stations within the predetermined time period. Alternatively, the negative ratio threshold may be set to 50%, so that the size of the contention window to be jointly used by the plurality of mobile stations may be increased when the wireless base station fails to correctly demodulate the uplink data of 50% mobile stations within the predetermined time period.

On the other hand, optionally, when the number or the ratio of the negative demodulation information in the data demodulation information of the plurality of mobile stations generated within the predetermined time period is smaller than the predetermined number or ratio threshold, it indicates that the channel states for the plurality of mobile stations are good and advantageous for data transmission. Thus, the size of the contention window to be jointly used by the plurality of mobile stations may be reset to a minimum value.

As another example, the contention window parameter may include a measurement result for a measurement performed by the wireless base station on the uplink sounding reference signal of the mobile station. In step S101, a measurement result for a measurement performed by the wireless base station on an uplink sounding reference signal of each of the plurality of mobile stations may be obtained. For example, a measurement result for a latest measurement performed by the wireless base station on an uplink sounding reference signal of each of the plurality of mobile stations may be obtained. Then, in step S102, the size of the contention window to be jointly used by the plurality of mobile stations is determined according to the obtained sounding reference signal measurement results.

Figure 3:
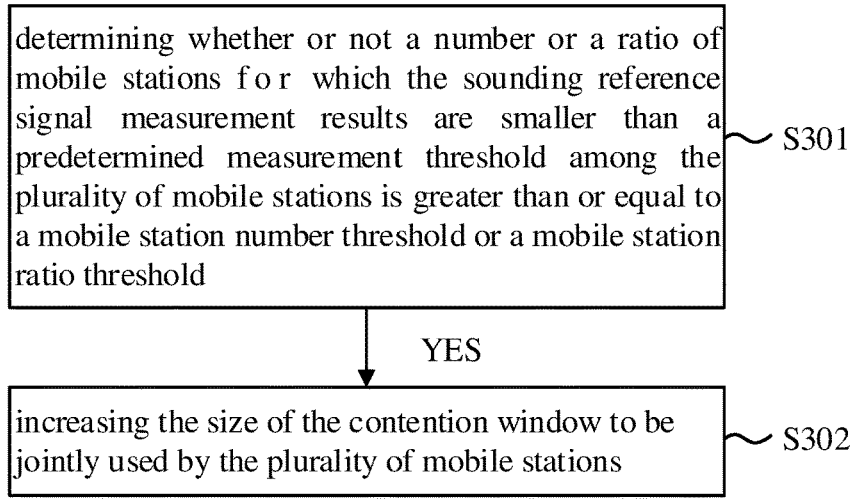
FIG. 3 is a flow chart describing a method for determining a size of a contention window in accordance with sounding reference signal measurement results, according to an example of the present invention.

FIG. 3 is a flow chart describing a method 300 for determining the size of the contention window according to the sounding reference signal measurement results according to an example of the present invention. As shown in FIG. 3, in step S301, it is determined whether or not a number or a ratio of the mobile stations for which the sounding reference signal measurement results are smaller than a predetermined measurement threshold among the plurality of mobile stations is greater than or equal to a mobile station number threshold or a mobile station ratio threshold. When the number or the ratio of the mobile stations for which sounding reference signal measurement results are smaller than the predetermined measurement threshold among the plurality of mobile stations is greater than or equal to the mobile station number threshold or the mobile station ratio threshold, it indicates that the channel states for the plurality of mobile stations are poor and are disadvantageous for data transmission. Thus, the size of the contention window to be jointly used by the plurality of mobile stations may be increased in step S302. The predetermined measurement threshold, the mobile station number threshold, or the mobile station ratio threshold may be set according to requirements for the channel states in the communication system. For example, when the requirements for the channel states are high, the predetermined measurement threshold for the sounding reference signal measurement results may be set to indicate a good measurement result, and the mobile station number threshold may be set to a large number or the mobile station ratio threshold may be set to a high ratio. Conversely, the predetermined measurement threshold for the sounding reference signal measurement results may be set to indicate a poor measurement result, and the mobile station number threshold may be set to a small number or the mobile station ratio threshold may be set to a low ratio.

On the other hand, optionally, when the number or the ratio of the mobile stations for which sounding reference signal measurement results are smaller than the predetermined measurement threshold is smaller than the mobile station number threshold or the mobile station ratio threshold, it indicates that the channel environment for the plurality of mobile stations is good and advantageous for data transmission. Thus, the size of the contention window to be jointly used by the plurality of mobile stations may be reset to a minimum value.

As another example, the contention window parameter may include a candidate window parameter indicating the size of the contention window to be used by the mobile station which is determined by the mobile station and notified to the base station. In step S101, the candidate window parameters for the respective mobile stations in the plurality of mobile stations may be obtained. Each mobile station may determine a size of a contention window suitable for itself according to its own channel state by using methods for determining a size of a contention window described below with reference to FIGS. 6-8, and may transmit the size to the base station as the candidate window parameter. Then, in step S102, the base station determines the size of the contention window to be jointly used by the plurality of mobile stations according to the obtained candidate window parameters of the respective mobile stations. For example, a first candidate window parameter transmitted by a first mobile station to the wireless base station indicates that the size of the contention window to be used by the first mobile station, which is determined by the first mobile station and notified to the base station, is 3; a second candidate window parameter transmitted by a second mobile station to the wireless base station indicates that the size of the contention window to be used by the second mobile station, which is determined by the second mobile station and notified to the base station, is 4; a third candidate window parameter transmitted by a third mobile station to the wireless base station indicates that the size of the contention window to be used by the third mobile station, which is determined by the third mobile station and notified to the base station, is 5. In step S102, the wireless base station may determine the size of the contention window to be jointed used by the first mobile station, the second mobile station and the third mobile stations according to one candidate window parameter which indicates a maximum contention window, i.e. the third candidate window parameter, among the first candidate window parameter, the second candidate window parameter and the third candidate window parameter.

In addition, according to another example of the present invention, in step S101, the wireless base station may obtain a contention window parameter of a specific mobile station, and in step S102, may determine the size of the contention window to be used by the specific mobile station according to the obtained contention window parameter.

For example, the contention window parameter may include data demodulation information. In step S101, the data demodulation information of the specific mobile station may be generated according to the demodulation of the uplink data from the specific mobile station. Specifically, the wireless base station may demodulate the uplink data from the specific mobile station in each uplink subframe and generate corresponding data demodulation information. The wireless base station may obtain the data demodulation information of the specific mobile station within a time period including one uplink subframe or a plurality of uplink subframes. Then, in step S102, the size of the contention window to be used by the specific mobile station may be determined according to negative demodulation information in the data demodulation information of the specific mobile station generated within a predetermined time period.

Figure 4:
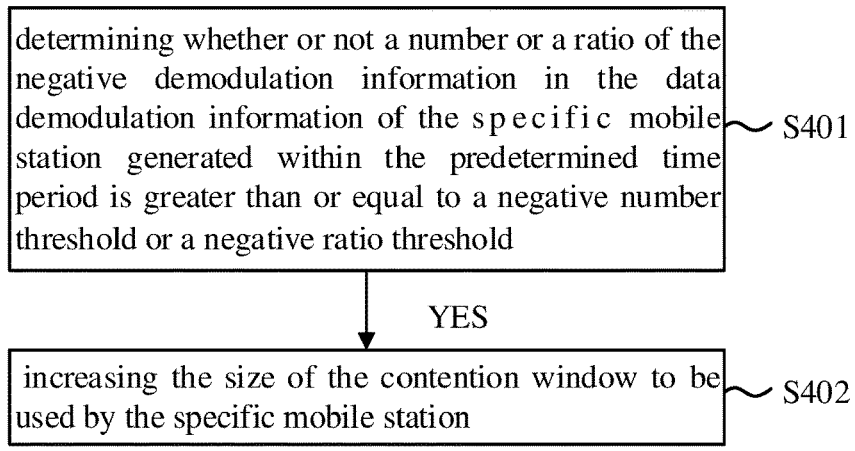
FIG. 4 is a flow chart describing a method for determining a size of a contention window in accordance with the negative demodulation information, according to another example of the present invention.

FIG. 4 is a flow chart describing a method 400 for determining the size of the contention window according to the negative demodulation information according to another example of the present invention. As shown in FIG. 4, in step S401, it is determined whether or not a number or a ratio of the negative demodulation information in data demodulation information of the specific mobile station generated within the predetermined time period is greater than or equal to a negative number threshold or a negative ratio threshold. When the number or the ratio of the negative demodulation information in the data demodulation information of the specific mobile station generated within the predetermined time period is greater than or equal to the negative number or ratio threshold, it indicates that the channel state for the specific mobile station is poor and is disadvantageous for data transmission. Thus, the size of the contention window to be used by the specific mobile station is increased in step S402. Similar to the method 200, the negative number or ratio threshold may be set according to the requirement for channel status in the communication system.

On the other hand, optionally, when the number or the ratio of the negative demodulation information in the data demodulation information of the specific mobile station generated within the predetermined time period is smaller than the predetermined number or ratio threshold, it indicates that the channel state for the specific mobile station is good and advantageous for data transmission. Thus, the size of the contention window to be used by the specific mobile station may be reset to a minimum value.

As another example, the contention window parameter may include a measurement result for a measurement performed by the wireless base station on the uplink sounding reference signal of the mobile station. In step S101, a measurement result for a measurement performed by the wireless base station on the uplink sounding reference signal of the specific mobile station is obtained. For example, the measurement result for a latest measurement performed by the wireless base station on the uplink sounding reference signal of the specific mobile station may be obtained. Then, in step S102, the size of the contention window to be used by the specific mobile station is determined according to the obtained sounding reference signal measurement result.

Figure 5:
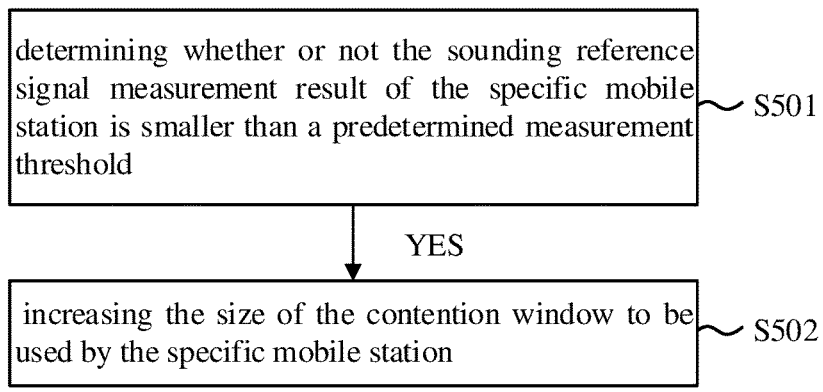
FIG. 5 is a flow chart describing a method for determining a size of a contention window in accordance with a sounding reference signal measurement result, according to another example of the present invention.

FIG. 5 is a flow chart describing a method 500 for determining the size of the contention window according to the sounding reference signal measurement result according to another example of the present invention. As shown in FIG. 5, in step S501, it is determined whether or not the sounding reference signal measurement result of the specific mobile station is smaller than a predetermined measurement threshold. When the sounding reference signal measurement result of the specific mobile station is smaller than the predetermined measurement threshold, it indicates that the channel state for the specific mobile station is poor and disadvantageous for data transmission. Thus, the size of the contention window to be used by the specific mobile station is increased in step S502. The predetermined measurement threshold may be set according to the requirement for the channel state in the communication system.

On the other hand, optionally, when the sounding reference signal measurement result of the specific mobile station is greater than or equal to the predetermined measurement threshold, it indicates that the channel state for the specific mobile station is good and advantageous for data transmission. Thus, the size of the contention window to be used by the specific mobile station may be reset to a minimum value.

Returning to FIG. 1, in step S103, backoff information is generated according to the determined size of the contention window, and the backoff information is notified to at least one mobile station. According to an example of the present invention, the backoff information may indicate the determined size of the contention window. According to another example of the present invention, the wireless base station may also randomly select the number of times of backoff that the mobile station needs to perform before transmitting data from a range of the contention window according to the determined size of the contention window, and may notify it to the mobile station. In this case, the backoff information may indicate the number of times of backoff selected by the wireless base station for the mobile station.

In addition, in step S103, the backoff information is notified to the plurality of mobile stations by a RRC signaling, a DCI signaling, or an initial signaling before downlink transmission bursts. Specifically, the wireless base station can notify the mobile stations of the backoff information by the RRC signaling so as to semi-statically notify the mobile stations of the information. Alternatively, the wireless base station may notify the mobile station of the backoff information by the DCI signaling, so as to dynamically notify the mobile station of the information. For example, when the backoff information is common backoff information for the plurality of mobile stations, the wireless base station may set the backoff information in a common search field of the DCI signaling, or may set the same backoff information in a mobile-station-specific search field of the DCI signaling; and when the backoff information is common backoff information for specific mobile stations, the wireless base station may set the backoff information in a corresponding mobile-station-specific search field of the DCI signaling. In addition, when the backoff information is common backoff information for the plurality of mobile stations, the wireless base station may notify the plurality of mobile stations of the backoff information by the initial signaling before the downlink transmission bursts, which is common for the respective mobile stations. The mobile station may set the size of the contention window to be used by it or the number of times of backoff according to the backoff information notified by the wireless base station.

In the methods for determining the size of the contention window according to the above embodiments of the present invention described above with reference to FIGS. 1-5, the wireless base station determines the size of the contention window to be used by the mobile station according to the contention window parameter regarding the mobile station. Thus, even if the mobile station cannot obtain the ACK/NACK signaling, the size of the contention window to be used by the mobile station or the number of times of backoff can be appropriately adjusted. In addition, by the methods for determining the size of the contention window according to the above embodiments of the present invention, the control of the wireless base station on the size of the contention window to be used by the mobile station or the number of times of backoff may be realized. Comparing with determining the size of the contention window by the mobile station, the wireless base station can schedule the mobile stations in a better way and realize multiplex of multiple users in the uplink.

Figure 6:
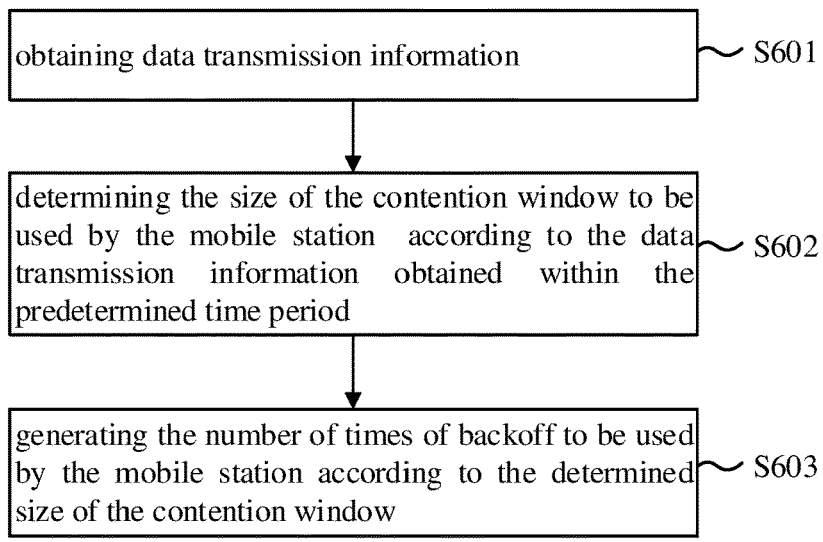
FIG. 6 is a flow chart describing a method for determining a size of a contention window according to another embodiment of the present invention.

FIG. 6 is a flow chart describing a method 600 for determining the size of the contention window according to another embodiment of the present invention. The method 600 for determining the size of contention window may be performed by the mobile station. Hereinafter, the method 600 for determining the size of the contention window according to the embodiment of the present invention will be presented in detail with reference to FIG. 6. As shown in FIG. 6, in step S601, data transmission information is obtained. The data transmission information indicates whether data transmitted by the mobile station scheduled by the wireless base station is new data or retransmitted old data. For example, the mobile station may receive a UL grant signaling from the wireless base station, and determine the data transmission information according to a new data indicator (NDI) in the received UL grant signaling. For example, when the NDI is toggled, it indicates that the data to be transmitted by the mobile station is new data, i.e. the old data has been correctly demodulated; when the NDI is not toggled, it indicates that the data to be transmitted by the mobile station is old data, i.e. the old data has not been correctly demodulated and needs to be retransmitted by the mobile station. Then, in step S602, the size of the contention window to be used by the mobile station is determined according to the data transmission information obtained within a predetermined time period. For example, the mobile station may determine the data transmission information according to the new data indication of the UL grant signaling in each subframe. In step S601, the mobile station can obtain the data transmission information determined within the predetermined time period. Then, in step S602, the size of the contention window to be used by the mobile station may be determined according to the data transmission information obtained within the predetermined time period. The predetermined time period may be one or more uplink subframes in the recent uplink transmission bursts, for example, one or more foremost subframes in the recent uplink transmission bursts, or one or more last subframes in the recent uplink transmission bursts.

Figure 7:
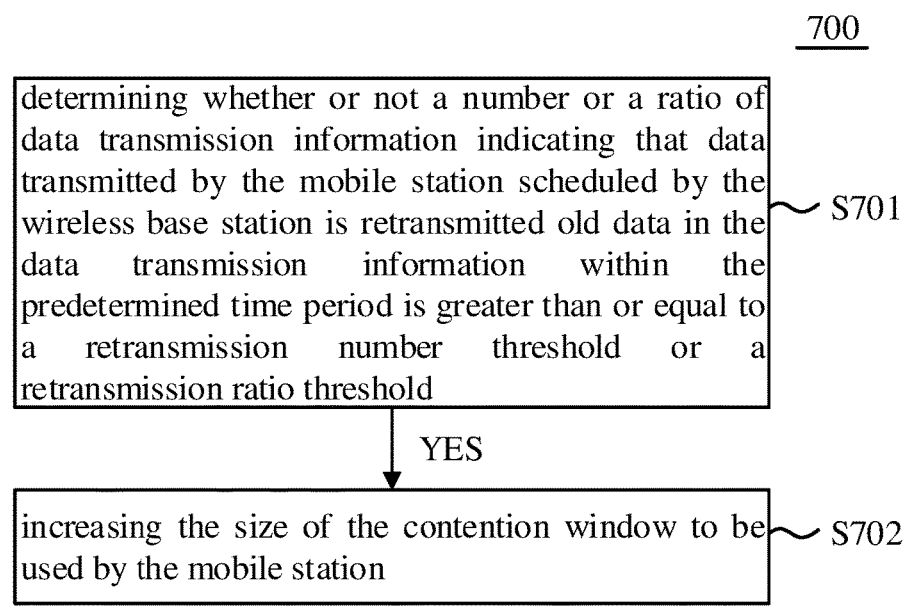
FIG. 7 is a flow chart describing a method for determining a size of a contention window to be used by a mobile station according to data transmission information according to an example of the present invention.

FIG. 7 is a flow chart describing a method 700 for determining the size of the contention window to be used by the mobile station according to the data transmission information according to an example of the present invention. As shown in FIG. 7, in step S701, it is determined whether or not a number or a ratio of data transmission information indicating that data transmitted by the mobile station scheduled by the wireless base station is retransmitted old data in the data transmission information within the predetermined time period is greater than or equal to a retransmission number threshold or a retransmission ratio threshold. When the number or the ratio of the data transmission information indicating that data transmitted by the mobile station scheduled by the wireless base station is retransmitted old data within the predetermined time period is greater than or equal to the retransmission number threshold or the retransmission ratio threshold, it indicates that the channel state for the mobile station is poor and disadvantageous for data transmission. Thus, the size of the contention window to be used by the mobile station may be increased in step S702. The retransmission number or retransmission ratio threshold may be set according to the requirement for the channel state in the communication system.

On the other hand, optionally, when the number or the ratio of the data transmission information indicating that data transmitted by the mobile station scheduled by the wireless base station is retransmitted old data within the predetermined time period is smaller than the retransmission number threshold or the retransmission ratio threshold, it indicates that the channel state for the mobile station is good and advantageous for data transmission. Thus, the size of the contention window to be used by the mobile station may be reset to a minimum value.

For example, the retransmission ratio threshold may be set to 100%. That is, when the ratio of the data transmission information indicating that data transmitted by the mobile station scheduled by the wireless base station is retransmitted old data within the predetermined time period is 100%, the size of the contention window to be used by the mobile station may be increased. Otherwise, the size of the contention window to be used by the mobile station may be reset to a minimum value.

Returning to FIG. 6, in step S603, the number of times of backoff to be used by the mobile station is generated according to the determined size of the contention window. For example, the mobile station may randomly select the number of times of backoff to be used between 0 and the determined size of the contention window.

Figure 8:
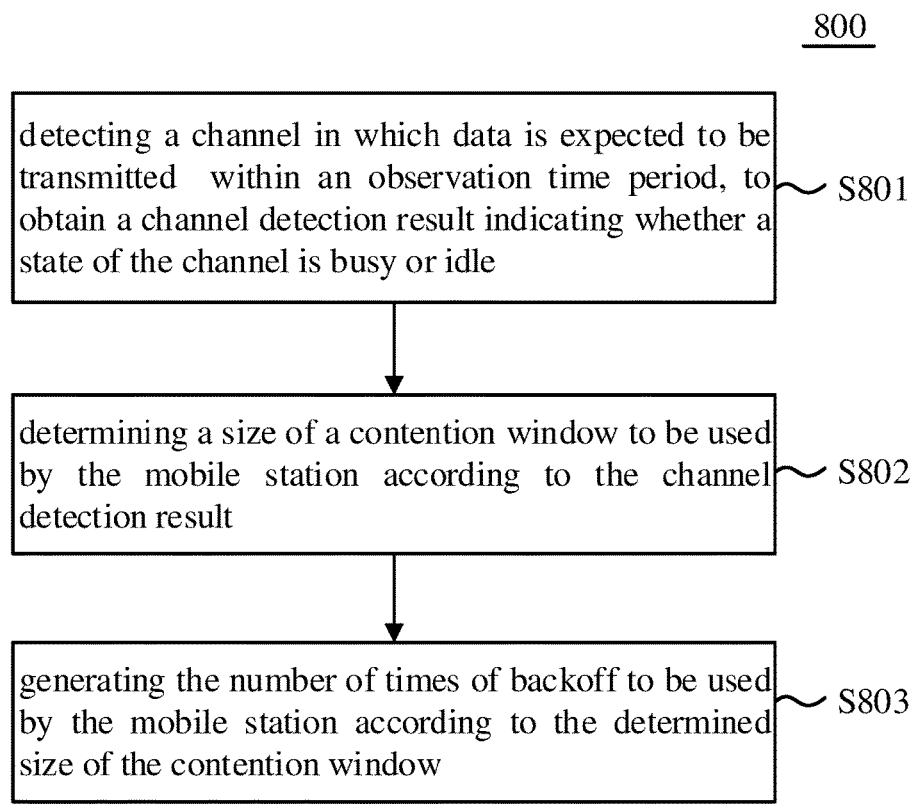
FIG. 8 is a flow chart describing a method for determining a size of a contention window according to another embodiment of the present invention.

FIG. 8 is a flow chart describing a method 800 for determining the size of the contention window according to another embodiment of the present invention. The method 800 for determining the size of the contention window may be performed by the mobile station. Hereinafter, the method 800 for determining the size of the contention window according to the embodiment of the present invention will be presented in detail with reference to FIG. 8. As shown in FIG. 8, in step S801, a channel in which data is expected to be transmitted is detected within an observation time period, to obtain a channel detection result indicating whether a state of the channel is busy or idle. Then, in step S802, the size of the contention window to be used by the mobile station is determined according to the channel detection result.

For example, the observation time period may include a plurality of time slots. A busy time slot in which the channel is busy and an idle time slot in which the channel is idle may be obtained in step S801. Then, in step S802, a number of busy time slots or idle time slots is determined, and the contention window to be used by the mobile station is adjusted. Specifically, in step S802, it may be determined whether the number or the ratio of the busy time slots is greater than or equal to a time slot number threshold or a time slot ratio threshold. When the number or the ratio of busy time slots is greater than or equal to the time slot number threshold or the time slot ratio threshold, it indicates that the channel state for the mobile station is poor and disadvantageous for data transmission. Therefore, in step S802, the size of the contention window to be jointly used by the mobile stations may be increased. The time slot number threshold or the time slot ratio threshold may be set according to the requirement for channel state in the communication system.

Figure 9:
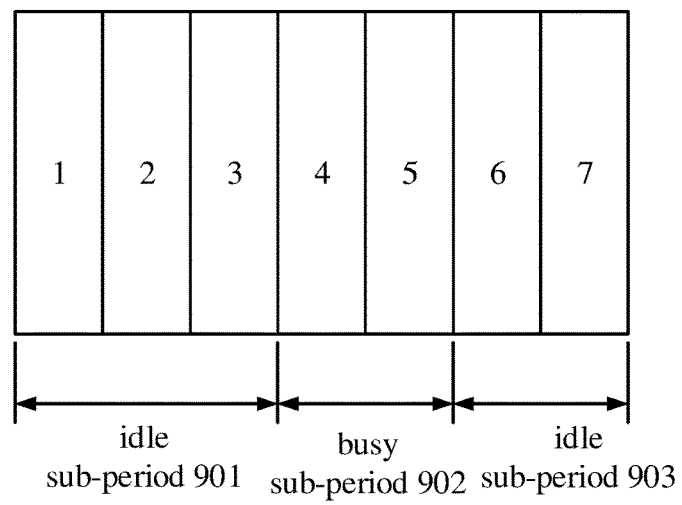
FIG. 9 is a schematic diagram showing an observation time period 900 according to an example of the present invention.

As another example, a busy sub-period in which the channel is continuously in the busy state and an idle sub-period in which the channel is continuously in the idle state within the observation time period may be obtained in step S801. Then, in step S802, the contention window to be used by the mobile station is adjusted according to a number of busy sub-periods or idle sub-periods. FIG. 9 is a schematic diagram illustrating an observation time period 900 according to an example of the present invention. As shown in FIG. 9, the observation time period 900 includes 7 time slots, where the channel is continuously in the idle state in time slots 1-3, the channel is continuously in the busy state in time slots 4 and 5 and the channel is continuously in the idle state in time slots 6 and 7. In this case, it can be determined that time slots 1-3 form an idle sub-period 901, the time slots 4 and 5 form a busy sub-period 902, and the time slots 6 and 7 form an idle sub-period 903. Thus, in the observation time period, the number of busy sub-periods is 1 and the number of idle sub-periods is 2. In step S802, it may be determined whether the number or the ratio of the busy sub-periods is greater than or equal to a sub-period number threshold or a sub-period ratio threshold. When the number or the ratio of the busy sub-periods is greater than or equal to the sub-period number threshold or the sub-period ratio threshold, it indicates that the channel state for the mobile station is poor and disadvantageous for data transmission. Therefore, in step S802, the size of the contention window to be jointly used by the mobile stations may be increased. The sub-period number threshold or the sub-period ratio threshold may be set according to the requirement for channel state in the communication system.

In step S803, the number of times of backoff to be used by the mobile station is generated according to the determined size of the contention window. For example, the mobile station may randomly select the number of times of backoff to be used between 0 and the determined size of the contention window.

In the methods for determining the size of the contention window according to the embodiments of the present invention described above with reference to FIGS. 6-8, the mobile station determines the size of the contention window to be used by the mobile stations according to the data transmission information regarding the mobile station or the channel detection result indicating whether the state of the channel is busy or idle. Thus, even if the mobile station cannot obtain the ACK/NACK signaling, the size of the contention window or the number of times of backoff to be used by the mobile station can also be appropriately adjusted.

In addition, in the methods for determining the size of the contention window according to the embodiments of the present invention described above with reference to FIGS. 6-8, after the mobile station determines the size of the contention window to be used by the mobile station according to the data transmission information or the channel detection result, the mobile station may notify the wireless base station of the determined size of the contention window. As described above, the wireless base station may further determine the size of the contention window to be jointly used by the plurality of mobile stations or the number of times of backoff to be jointly used by the plurality of mobile stations according to the sizes of the contention windows determined by the respective mobile stations, and notify the same to the plurality of mobile stations, so that each of the plurality of mobile stations sets and performs the backoff algorithm according to the information notified by the wireless base station.

In addition to the above methods for determining the size of the contention window according to the embodiments of the present invention, according to another embodiment of the present invention, the size of the contention window may be adjusted according to a time period in which the size of the contention window has been maintained, to prevent the mobile station from being in a state in which the mobile station may select a large number of times of backoff for a long time, which causes a long waiting time for the user. Specifically, when a number of times or time for which a maximum contention window is continuously used by the mobile station reaches a preset maximum window usage number of times threshold or a preset maximum window usage time threshold, the size of the contention window to be used by the mobile station may be reset to a minimum value by the wireless base station or by the mobile station itself.

In addition, according to another embodiment of the present invention, when time in which the mobile station does not perform the uplink transmission, i.e. time in which the mobile station is not subject to uplink schedule, exceeds a predetermined time threshold, the size of the contention window may be reset to a minimum value by the wireless base station or by the mobile station itself, in order to reduce the time for which the user has to wait when it needs to perform the uplink transmission.

Figure 10:
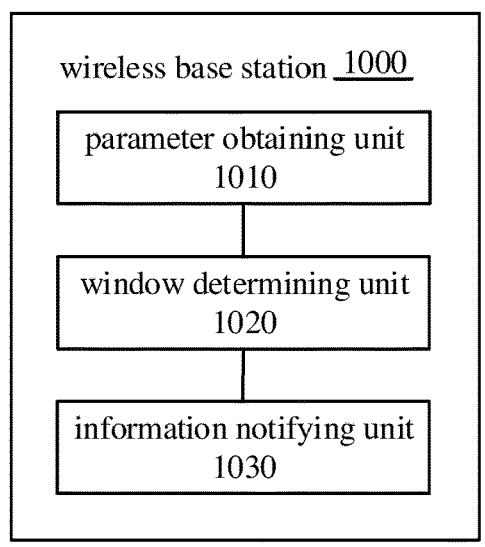
FIG. 10 shows a block diagram of a wireless base station according to an embodiment of the present invention.

Next, a wireless base station according to an embodiment of the present invention will be described with reference to FIG. 10. FIG. 10 shows a block diagram of the wireless base station 1000 according to an embodiment of the present invention. As shown in FIG. 10, the wireless base station 1000 includes a parameter obtaining unit 1010, a window determining unit 1020, and an information notifying unit 1030. The wireless base station 1000 may further comprise other components than the three units, for example, a component that performs various processing on data signals or control signals. However, since these components are not related to content of the embodiments of the present invention, the drawing and description thereof are omitted herein. In addition, since specific details of operations performed by the wireless base station 1000 according to the embodiment of the present invention are the same as those described above with reference to FIGS. 1-5, repeated descriptions of the same details are omitted herein to avoid redundancy.

The parameter obtaining unit 1010 may obtain a contention window parameter regarding at least one mobile station. For example, the contention window parameter may include a channel quality parameter regarding a channel quality for the mobile station, or may include a candidate window parameter indicating a size of a contention window to be used by the mobile station which is determined by the mobile station and is notified to the base station. According to an example of the present invention, the channel quality parameter may include data demodulation information which indicates whether or not the wireless base station correctly demodulates the uplink data. For example, the wireless base station may demodulate the uplink data transmitted from the mobile station, and the data demodulation information may include positive demodulation information indicating that the wireless base station correctly demodulates the uplink data, and negative demodulation information indicating that the wireless base station fails to correctly demodulate the uplink data. According to another example of the present invention, the channel quality parameter may include an uplink sounding reference signal measurement result. For example, the wireless base station may measure a channel for the mobile station by using an uplink sounding reference signal and generate the uplink sounding reference signal measurement result.

Then, the window determining unit 1020 may determine a size of a contention window to be used by the at least one mobile station according to the obtained contention window parameter. In the embodiment according to the present invention, the contention window refers to a window for determining a listening strategy for an unlicensed frequency band before data transmission when the mobile station carries on wireless communication in the unlicensed frequency band. Specifically, the contention window may indicate a maximum number of time slots in which the mobile station needs to listen to that the channel is in the idle state before it transmits data. In other words, the contention window may indicate a maximum number of times of backoff that needs to be performed by the mobile station before transmitting data.

According to an example of the present invention, when the wireless base station desires to simultaneously schedule a plurality of mobile stations, the parameter obtaining unit 1010 may obtain contention window parameters for the plurality of mobile stations, and the window determining unit 1020 may determine the size of the contention window to be jointly used by the plurality of mobile stations according to the obtained plurality of channel quality parameters for the plurality of mobile stations. When the plurality of mobile stations use the contention window that is jointly used, timings for the plurality of mobile stations to transmit data are close to each other, which facilitates that the wireless base station simultaneously schedules the data transmitted by the plurality of mobile stations as one subframe.

For example, the contention window parameter may include data demodulation information. The parameter obtaining unit 1010 may generate the data demodulation information for the uplink data of each of the plurality of mobile stations according to the demodulation of the uplink data from the mobile station. Specifically, the wireless base station may demodulate the uplink data from the respective mobile stations in each uplink subframe, and generate corresponding data demodulation information. The wireless base station may obtain the data demodulation information of the respective mobile stations within a time period including one uplink subframe or a plurality of uplink subframes. Then, the window determining unit 1020 may determine the size of the contention window to be jointly used by the plurality of mobile stations according to negative demodulation information in the data demodulation information of the plurality of mobile stations generated within a predetermined time period. For example, the window determining unit 1020 may determine whether or not a number or a ratio of the negative demodulation information in the data demodulation information of the plurality of mobile stations generated within the predetermined time period is greater than or equal to a negative number threshold or a negative ratio threshold. When the number or the ratio of the negative demodulation information in the data demodulation information of the plurality of mobile stations generated within the predetermined time period is greater than or equal to the negative number threshold or the negative ratio threshold, it indicates that the channel states for the plurality of mobile stations are poor and disadvantageous for data transmission. Thus, the window determining unit 1020 may increase the size of the contention window to be jointly used by the plurality of mobile stations. The negative number threshold or the negative ratio threshold may be set according to the requirements for the channel states in the communication system. For example, the negative number threshold may be set to 1 when the requirements for the channel states are high, so that the size of the contention window to be jointly used by the plurality of mobile stations may be increased as long as there is the negative demodulation information in the data demodulation information of the plurality of mobile stations generated within the predetermined time period. As another example, the negative ratio threshold may be set to 100% when the requirements for the channel states are low, so that the size of the contention window to be jointly used by the plurality of mobile stations may be increased only when the wireless base station fails to correctly demodulate the uplink data of all mobile stations within the predetermined time period.

Alternatively, the negative ratio threshold may be set to 50%, so that the size of the contention window to be jointly used by the plurality of mobile stations may be increased when the wireless base station fails to correctly demodulate the uplink data of 50% mobile stations within the predetermined time period.

On the other hand, optionally, when the number or the ratio of the negative demodulation information in the data demodulation information of the plurality of mobile stations generated within the predetermined time period is smaller than the predetermined number or ratio threshold, it indicates that the channel states for the plurality of mobile stations are good and advantageous for data transmission. Thus, the window determining unit 1020 may reset the size of the contention window to be jointly used by the plurality of mobile stations to a minimum value.

As another example, the contention window parameter may include a measurement result for a measurement performed by the wireless base station on the uplink sounding reference signal of the mobile station. The parameter obtaining unit may obtain a measurement result for a measurement performed by the wireless base station on an uplink sounding reference signal of each of the plurality of mobile stations. For example, a measurement result for a latest measurement performed by the wireless base station on an uplink sounding reference signal of each of the plurality of mobile stations may be obtained. Then, the window determining unit 1020 may determine the size of the contention window to be jointly used by the plurality of mobile stations according to the obtained sounding reference signal measurement results. The window determining unit 1020 may determine whether or not a number or a ratio of the mobile stations for which the sounding reference signal measurement results are smaller than a predetermined measurement threshold among the plurality of mobile stations is greater than or equal to a mobile station number threshold or a mobile station ratio threshold. When the number or the ratio of the mobile stations for which sounding reference signal measurement results are smaller than the predetermined measurement threshold among the plurality of mobile stations is greater than or equal to the mobile station number threshold or the mobile station ratio threshold, it indicates that the channel states for the plurality of mobile stations are poor and disadvantageous for data transmission. Thus, the window determining unit 1020 may increase the size of the contention window to be jointly used by the plurality of mobile stations. The predetermined measurement threshold, the mobile station number threshold or the mobile station ratio threshold may be set according to the requirements for the channel states in the communication system. For example, when the requirements for the channel states are high, the predetermined measurement threshold for the sounding reference signal measurement results may be set to indicate a good measurement result, and the mobile station number threshold may be set to a large number or the mobile station ratio threshold may be set to a high ratio. Conversely, the predetermined measurement threshold for the sounding reference signal measurement results may be set to indicate a poor measurement result, and the mobile station number threshold may be set to a small number or the mobile station ratio threshold may be set to a low ratio.

On the other hand, optionally, when the number or the ratio of the mobile stations for which sounding reference signal measurement results are smaller than the predetermined measurement threshold is smaller than the mobile station number threshold or the mobile station ratio threshold, it indicates that the channel environment for the plurality of mobile stations is good and advantageous for data transmission. Thus, the window determining unit 1020 may reset the size of the contention window to be jointly used by the plurality of mobile stations to a minimum value.

As another example, the contention window parameter may include a candidate window parameter indicating the size of the contention window to be used by the mobile station which is determined by the mobile station and notified to the base station. The parameter obtaining unit 1010 may obtain the candidate window parameters for the respective mobile stations in the plurality of mobile stations. For example, each mobile station may determine the size of the contention window suitable for itself according to its own channel state by the methods for determining the size of the contention window described above with reference to FIGS. 6-8, and may transmit the size to the base station as the candidate window parameter. Then the window determining unit 1020 may determine the size of the contention window to be jointly used by the plurality of mobile stations according to the obtained candidate window parameters of the respective mobile stations.

In addition, according to another example of the present invention, the parameter obtaining unit 1010 may obtain a contention window parameter of a specific mobile station, and the window determining unit 1020 may determine the size of the contention window to be used by the specific mobile station according to the obtained contention window parameter.

For example, the contention window parameter may include data demodulation information. The parameter obtaining unit 1010 may generate the data demodulation information of the specific mobile station according to the demodulation of the uplink data from the specific mobile station. Specifically, the wireless base station may demodulate the uplink data from the specific mobile station in each uplink subframe and generate corresponding data demodulation information. The wireless base station may obtain the data demodulation information of the specific mobile station within a time period including one uplink subframe or a plurality of uplink subframes. Then, the window determining unit 1020 may determine the size of the contention window to be used by the specific mobile station according to negative demodulation information in the data demodulation information of the specific mobile station generated within a predetermined time period. The window determining unit 1020 may determine whether or not a number or a ratio of the negative demodulation information in data demodulation information of the specific mobile station generated within the predetermined time period is greater than or equal to a negative number threshold or a negative ratio threshold. When the number or the ratio of the negative demodulation information in the data demodulation information of the specific mobile station generated within the predetermined time period is greater than or equal to the negative number threshold or the negative ratio threshold, it indicates that the channel state for the specific mobile station is poor and disadvantageous for data transmission. Thus, the window determining unit 1020 may increase the size of the contention window to be used by the specific mobile station. The window determining unit 1020 may set the negative number threshold or the negative ratio threshold according to the requirement for channel status in the communication system.

On the other hand, optionally, when the number or the ratio of the negative demodulation information in the data demodulation information of the specific mobile station generated within the predetermined time period is smaller than the predetermined number or ratio threshold, it indicates that the channel state for the specific mobile station is good and advantageous for data transmission. Thus, the window determining unit 1020 may reset the size of the contention window to be used by the specific mobile station may to a minimum value.

As another example, the contention window parameter may include a measurement result for a measurement performed by the wireless base station on the uplink sounding reference signal of the mobile station. The parameter obtaining unit 1010 may obtain a measurement result for a measurement performed by the wireless base station on the uplink sounding reference signal of the specific mobile station. For example, a measurement result for a latest measurement performed by the wireless base station on the uplink sounding reference signal of the specific mobile station may be obtained. Then, the window determining unit 1020 may determine the size of the contention window to be used by the specific mobile station according to the obtained sounding reference signal measurement result. The window determining unit 1020 may whether or not the sounding reference signal measurement result of the specific mobile station is smaller than a predetermined measurement threshold. When the sounding reference signal measurement result of the specific mobile station is smaller than the predetermined measurement threshold, it indicates that the channel state for the specific mobile station is poor and disadvantageous for data transmission. Thus, the window determining unit 1020 may increase the size of the contention window to be used by the specific mobile station. The predetermined measurement threshold may be set according to the requirement for the channel state in the communication system.

On the other hand, optionally, when the sounding reference signal measurement result of the specific mobile station is greater than or equal to the predetermined measurement threshold, it indicates that the channel state for the specific mobile station is good and advantageous for data transmission. Thus, the window determining unit 1020 may reset the size of the contention window to be used by the specific mobile station to a minimum value.

The information notifying unit 1030 may generate backoff information according to the determined size of the contention window, and notify the at least one mobile station of the backoff information. According to an example of the present invention, the backoff information may indicate the determined size of the contention window. According to another example of the present invention, the wireless base station may also randomly select the number of times of backoff that the mobile station needs to perform before transmitting data from a range of the contention window according to the determined size of the contention window, and may notify it to the mobile station. In this case, the backoff information may indicate the number of times of backoff selected by the wireless base station for the mobile station.

In addition, the information notifying unit 1030 may notify the backoff information to the plurality of mobile stations by a RRC signaling, a DCI signaling, or an initial signaling before downlink transmission bursts. Specifically, the wireless base station can notify the mobile stations of the backoff information by the RRC signaling so as to semi-statically notify the mobile stations of the information. Alternatively, the wireless base station may notify the mobile station of the backoff information by the DCI signaling, so as to dynamically notify the mobile station of the information. For example, when the backoff information is common backoff information for the plurality of mobile stations, the wireless base station may set the backoff information in a common search field of the DCI signaling, or may set the same backoff information in a mobile-station-specific search field of the DCI signaling; and when the backoff information is common backoff information for specific mobile stations, the wireless base station may set the backoff information in a corresponding mobile-station-specific search field of the DCI signaling. In addition, when the backoff information is common backoff information for the plurality of mobile stations, the wireless base station may notify the plurality of mobile stations of the backoff information by the initial signaling before the downlink transmission bursts, which is common for the respective mobile stations.

The wireless base station according to the above embodiment of the present application determines the size of the contention window to be used by the mobile station according to the contention window parameter regarding the mobile station. Thus, even if the mobile station cannot obtain the ACK/NACK signaling, the size of the contention window or the number of times of backoff to be used by the mobile station can also be appropriately adjusted. In addition, by the base station for determining the size of the contention window according to the above embodiment of the present invention, the control of the wireless base station on the size of the contention window or the number of times of backoff to be used by the mobile station may be realized. Comparing with determining the size of the contention window by the mobile station, the wireless base station can schedule the mobile stations in a better way.

Figure 11:
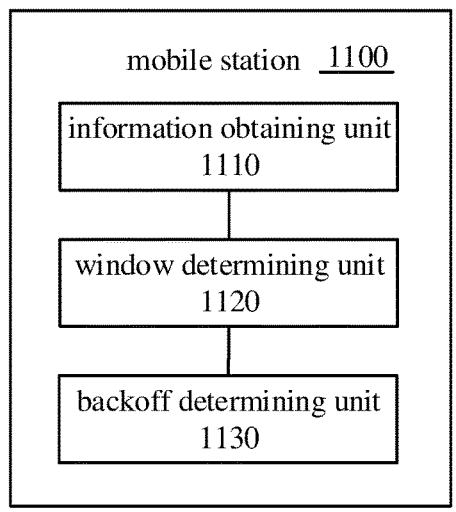
FIG. 11 shows a block diagram of a mobile station according to an embodiment of the present invention.

Next, a mobile station according to an embodiment of the present invention will be described with reference to FIG. 11. FIG. 11 shows a block diagram of the mobile station 1100 according to an embodiment of the present invention. As shown in FIG. 11, the mobile station 1100 includes an information obtaining unit 1110, a window determining unit 1120, and a backoff determining unit 1130. The mobile station 1100 may further comprise other components than the three units, for example, a component that performs various processing on data signals or control signals. However, since these components are not related to content of the embodiments of the present invention, the drawing and description thereof are omitted herein. In addition, since specific details of operations performed by the mobile station 1100 according to the embodiment of the present invention are the same as the details described above with reference to FIGS. 6-7, repeated descriptions of the same details are omitted herein to avoid redundancy.

As shown in FIG. 11, the information obtaining unit 1110 may obtain data transmission information indicating whether data transmitted by the mobile station scheduled by the wireless base station is new data or retransmitted old data. For example, the mobile station may receive a UL grant signaling from the wireless base station and determine the data transmission information according to a new data indicator (NDI) in the received UL grant signaling.

Then, the window determining unit 1120 may determine the size of the contention window to be used by the mobile station according to the data transmission information obtained within a predetermined time period. For example, the mobile station may determine the data transmission information according to the new data indication of the UL grant signaling in each subframe. The information obtaining unit 1110 may obtain the data transmission information determined within a time period including one uplink subframe or a plurality of subframes. Then, the window determining unit 1120 may determine the size of the contention window to be used by the mobile station according to the data transmission information obtained within the predetermined time period.

For example, the window determining unit 1120 may determine whether or not a number or a ratio of data transmission information indicating that data transmitted by the mobile station scheduled by the wireless base station is retransmitted old data in the data transmission information within the predetermined time period is greater than or equal to a retransmission number threshold or a retransmission ratio threshold. When the number or the ratio of the data transmission information indicating that data transmitted by the mobile station scheduled by the wireless base station is retransmitted old data in the data transmission information within the predetermined time period is greater than or equal to the retransmission number threshold or the retransmission ratio threshold, it indicates that the channel state for the mobile station is poor and disadvantageous for data transmission. Thus, the window determining unit 1120 may increase the size of the contention window to be used by the mobile station. The retransmission number threshold or the retransmission ratio threshold may be set according to the requirement for the channel state in the communication system.

On the other hand, optionally, when the number or the ratio of the data transmission information indicating that data transmitted by the mobile station scheduled by the wireless base station is retransmitted old data within the predetermined time period is smaller than the retransmission number threshold or the retransmission ratio threshold, it indicates that the channel state for the mobile station is good and advantageous for data transmission. Thus, the window determining unit 1120 may reset the size of the contention window to be jointly used by the mobile stations to a minimum value.

The backoff determining unit 1130 may generate a number of times of backoff to be used by the mobile station according to the determined size of the contention window. For example, the mobile station may randomly select the number of times of backoff to be used between 0 and the determined size of the contention window.

Figure 12:
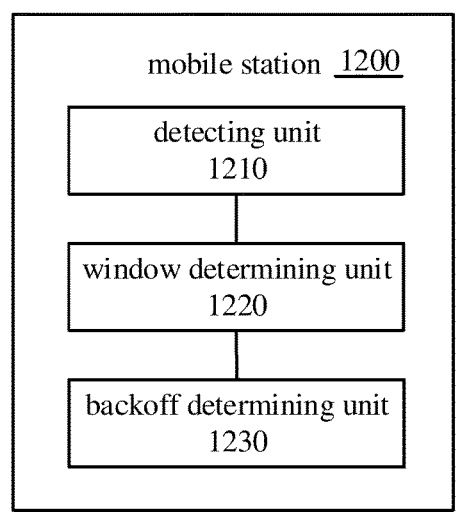
FIG. 12 shows a block diagram of a mobile station according to an embodiment of the present invention.

Next, a mobile station according to an embodiment of the present invention will be described with reference to FIG. 12. FIG. 12 shows a block diagram of the mobile station 1200 according to an embodiment of the present invention. As shown in FIG. 12, the mobile station 1200 includes a detecting unit 1210, a window determining unit 1220, and a backoff determining unit 1230. The mobile station 1200 may further comprise other components than the three units, for example, a component that performs various processing on data signals or control signals. However, since these components are not related to content of the embodiment of the present invention, the drawing and description thereof are omitted herein. In addition, since specific details of operations performed by the mobile station 1200 according to the embodiment of the present invention are the same as the details described above with reference to FIG. 8, repeated descriptions of the same details are omitted herein to avoid redundancy.

For example, the observation time period may include a plurality of time slots. The detecting unit 1210 may obtain a busy time slot in which the channel is busy and an idle time slot in which the channel is idle. Then, the window determining unit 1220 may determine a number of busy time slots or idle time slots, and adjust the contention window to be used by the mobile station. Specifically, the window determining unit 1220 may determine whether the number or the ratio of the busy time slots is greater than or equal to a time slot number threshold or a time slot ratio threshold. When the number or the ratio of the busy time slots is greater than or equal to the time slot number threshold or the time slot ratio threshold, it indicates that the channel state for the mobile station is poor and disadvantageous for data transmission. Therefore, the window determining unit 1220 may increase the size of the contention window to be jointly used by the mobile stations. The time slot number threshold or the time slot ratio threshold may be set according to the requirement for channel state in the communication system.

As another example, the detecting unit 1210 may obtain a busy sub-period in which the channel is continuously in the busy state and an idle sub-period in which the channel is continuously in the idle state within the observation time period. Then, the window determining unit 1220 may adjust the contention window to be used by the mobile station according to a number of busy sub-periods or idle sub-periods. Specifically, the window determining unit 1220 may determine whether the number or the ratio of the busy sub-periods is greater than or equal to a sub-period number threshold or a sub-period ratio threshold. When the number or the ratio of the busy sub-periods is greater than or equal to the sub-period number threshold or the sub-period ratio threshold, it indicates that the channel state for the mobile station is poor and disadvantageous for data transmission. Therefore, the window determining unit 1220 may increase the size of the contention window to be jointly used by the mobile stations. The window determining unit 1220 may set the sub-period number threshold or the sub-period ratio threshold according to the requirement for channel state in the communication system.

The backoff determining unit 1230 may generate the number of times of backoff to be used by the mobile station according to the determined size of the contention window. For example, the mobile station may randomly select the number of times of backoff to be used between 0 and the determined size of the contention window.

In the methods for determining the size of the contention window according to the embodiments of the present invention described above with reference to FIGS. 11-12, the mobile station determines the size of the contention window to be used by the mobile stations according to the data transmission information or the channel detection result indicating whether the state of the channel is busy or idle for the mobile station. Thus, even if the mobile station cannot obtain the ACK/NACK signaling, the size of the contention window or the number of times of backoff to be used by the mobile station can be appropriately adjusted.

In addition, in the methods for determining the size of the contention window according to the embodiments of the present invention described above with reference to FIGS. 11-12, after the mobile station determines the size of the contention window to be used by the mobile station according to the data transmission information or the channel detection result, the mobile station may notify the wireless base station of the size of the determined contention window. As described above, the wireless base station may further determine the size of the contention window to be jointly used by the plurality of mobile stations according to the sizes of the contention windows determined by the respective mobile stations, and notify it to the plurality of mobile stations, so as to facilitate the wireless base station to schedule the plurality of mobile stations.

According to another embodiment of the present invention, the wireless mobile station or the mobile station may adjust the size of the contention window according to a time period in which the size of the contention window has been maintained, to prevent the mobile station from being in a state in which the mobile station may select a large number of times of backoff for a long time, which causes a long waiting time for the user. Specifically, when a number or time for which a maximum contention window is continuously used by the mobile station reaches a preset maximum window usage number threshold or a preset maximum window usage time threshold, the size of the contention window to be used by the mobile station may be reset to a minimum value by the wireless base station or by the mobile station itself.

In addition, according to another embodiment of the present invention, when time in which the mobile station does not perform the uplink transmission exceeds a predetermined time threshold, the size of the contention window may be reset to a minimum value by the wireless base station or by the mobile station itself, in order to reduce the time for which the user has to wait when it needs to perform the uplink transmission.

The operations of the base station 1000, the mobile station 1100, and the mobile station 1200 described above may be implemented by hardware or by software modules executed by a processor, or may be further implemented by a combination of hardware and software modules.

The software modules may be arranged in a storage medium in any format, such as a RAM (Random Access Memory), a flash memory, a ROM (Read Only Memory), an EPROM (Erasable Programmable ROM), an EEPROM (Electrically Erasable Programmable ROM), a register, a hard disk, a removable disk, and/or a CD-ROM.

Such storage medium is connected to the processor so that the processor can write information into the storage medium or read information from the storage medium. Such storage medium can also be accumulated in the processor. Such storage medium and processor may be arranged in an ASIC. Such ASIC may be arranged in the base station 1000, the mobile station 1100, and the mobile station 1200. As discrete components, such storage medium and processor may be arranged in the base station 1000, the mobile station 1100, and the mobile station 1200.

Therefore, the present invention has been explained in detail by using the above embodiments; however, it is apparent for those skilled in the art that the present invention is not limited to the embodiments explained herein. The invention may be implemented in a corrected, modified mode without departing from the scope of the invention defined by the claims. Therefore, the description of the specification is only intended to explain the examples, and does not impose any limit on the present invention.

What is claimed is:

1. A method for determining a size of a contention window, performed by a mobile station, comprising:
    obtaining data transmission information indicating whether data transmitted by the mobile station is new data or retransmitted old data; and
    determining the size of the contention window to be used by the mobile station according to the data transmission information obtained within a predetermined time period,
    wherein the determining the size of the contention window to be used by the mobile station according to the data transmission information obtained within a predetermined time period comprises:
    determining whether or not a number of pieces of data transmission information indicating that data transmitted by the mobile station is retransmitted old data, which are obtained within the predetermined time period, is greater than a number threshold; and
    when the number of pieces of data transmission information indicating that data transmitted by the mobile station is retransmitted old data, which are obtained within the predetermined time period, is greater than the number threshold, increasing the size of the contention window to be used by the mobile station, otherwise resetting the size of the contention window to be used by the mobile station to a minimum value.

2. The method of claim 1, further comprising:
    when a number of times for which a maximum contention window is continuously used by the mobile station for channel access contention reaches a preset maximum window usage number of times threshold, resetting the size of the contention window to be used to a minimum value.

3. The method of claim 1, further comprising:
    generating a number of times for backoff to be used by the mobile station according to the determined size of the contention window.

4. The method of claim 3, wherein the generating a number of times for backoff to be used by the mobile station according to the determined size of the contention window comprises:
    randomly selecting a value between 0 and the determined size of the contention window, to generate the number of times for backoff to be used by the mobile station.

5. A mobile station comprising:
    a processor configured to obtain data transmission information indicating whether data transmitted by the mobile station is new data or retransmitted old data, and determine a size of a contention window to be used by the mobile station according to the data transmission information obtained within a predetermined time period, wherein
    the processor determines whether or not a number of pieces of data transmission information indicating that data transmitted by the mobile station is retransmitted old data, which are obtained within the predetermined time period, is greater than a number threshold, and when the number of pieces of data transmission information indicating that data transmitted by the mobile station is retransmitted old data, which are obtained within the predetermined time period, is greater than the number threshold, increases the size of the contention window to be used by the mobile station, otherwise resets the size of the contention window to be used by the mobile station to a minimum value.

6. The mobile station of claim 5, wherein
    when a number of times for which a maximum contention window is continuously used by the mobile station for channel access contention reaches a preset maximum window usage number of times threshold, the processor resets the size of the contention window to be used to a minimum value.

7. The mobile station of claim 5, wherein
    the processor generates a number of times for backoff to be used by the mobile station according to the determined size of the contention window.

8. The mobile station of claim 7, wherein
    the processor randomly selects a value between 0 and the determined size of the contention window, to generate the number of times for backoff to be used by the mobile station.

* * * * *